Patented Jan. 8, 1929.

1,698,233

UNITED STATES PATENT OFFICE.

CARL KRAUSS, OF LEVERKUSEN, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

VAT INDIGOID DYESTUFFS FROM DIHALOGENO-ALKYLISATINS.

No Drawing. Application filed October 25, 1926, Serial No. 144,191, and in Germany November 25, 1925.

My invention provides for the production of novel valuable vat dyestuffs which when applied to textile fibres are distinguished by their fast blue shades.

This application contains subject matter in common with my application Serial No. 143,796, filed Oct. 23, 1926;

The novel products described herein are the symmetrical tetrahalogeno alkyl-indigos of the general formula:

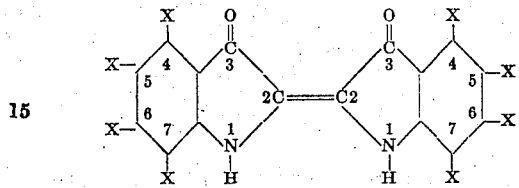

in which two of the X's in each benzene nucleus stand for a halogen atom particularly chlorine or bromine and at least one of the X's in each nucleus for an alkyl group. They can be produced as described in my co-pending patent application Serial No. 143,796 filed Oct. 23, 1926, by condensing a dihalogeno-alkyl-isatin compound containing a reactive substituent in alpha position with a dihalogen-alkyl-indoxyl but my preferred process is to reduce dihalogeno-alkyl-isatin compounds containing a reactive substituent in alpha position.

Such reactive substituents are the halogen atoms, particularly chlorine, sulfur, arylamino groups, alkoxy groups, etc.

A very convenient manner of producing these symmetrical tetrahalogeno-alkyl-indigos is to reduce the dihalogeno-alkyl-isatin alpha chlorides with hydrogen sulfide.

The following example will further illustrate my invention, the parts being by weight, but it is understood that my invention is not limited to the specific material and reaction conditions mentioned therein.

*Example 1.*—23 parts 5-7-dichloro-6-methylisatin are dissolved in chlorobenzene and treated with 25 parts phosphorous pentachloride. Into the so obtained solution of the alpha chloride one introduces at 90° C. a current of hydrogen sulfide gas. The alpha chloride is reduced to the indigo which separates and is isolated in the usual manner. It is in the dry state a dark blue powder, soluble in concentrated sulfuric acid with a green color, it has most probably the formula:—

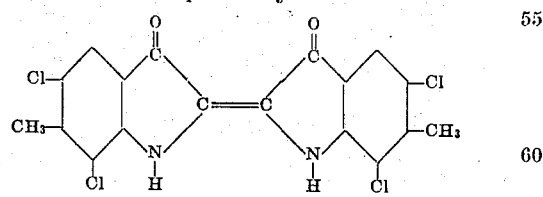

It forms a yellow vat from which cotton is dyed beautiful, fast reddish-blue shades.

*Example 2.*—24.4 parts 4-6-dimethyl-5-7-dichloroisatin are dissolved in 400 parts chlorobenzene, treated with 25 parts of phosphorous pentachloride, heated to 90°C. Into the so obtained solution of the alpha chloride one introduces at 90° C. a current of hydrogen sulfide gas for so a long time until all the dyestuff is separated. The working up is performed in the usual manner. The dyestuff is in the dry state a dark blue powder soluble in concentrated sulfuric acid with a green color and has most probably the formula:—

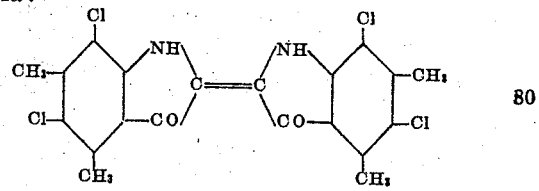

It forms a yellow vat from which cotton is dyed beautiful, fast blue shades.

I claim:

1. In processes of producing symmetrical indigoid vat dyestuffs the step consisting in reducing a dihalogeno-alkyl-isatin compound of the formula:

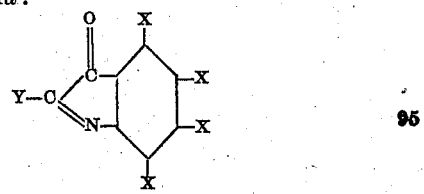

in which two of the X's stand for halogen atoms of an atomic weight of not more than 80 and not less than 35 and at least one of the X's for an alkyl group and Y is a reactive substituent.

2. In processes of producing symmetrical indigoid vat dyestuffs the step consisting in treating with hydrogen sulfide a dihalogeno-alkyl-isatin alpha chloride of the formula

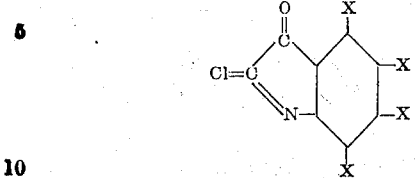

in which two of the X's stand for chlorine or bromine atoms and at least one of the X's for an alkyl group.

3. In processes of producing symmetrical indigoid vat dyestuffs the step consisting in treating 5-7-dichloro-6-methyl-isatin alpha chloride with hydrogen sulfide.

4. As new products symmetrical indigoid vat dyestuffs of the general formula

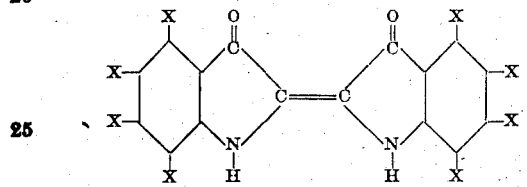

in which two of the X's in each benzene nucleus stand for halogen atoms of an atomic weight of not more than 80 and not less than 35 and at least one of the X's in each benezene nucleus for an alkyl group, which are a dark blue powder, soluble in concentrated sulfuric acid with greenish colors and forming yellow vats from which cotton is dyed fast blue shades.

5. As new products symmetrical indigoid vat dyestuffs of the general formula:—

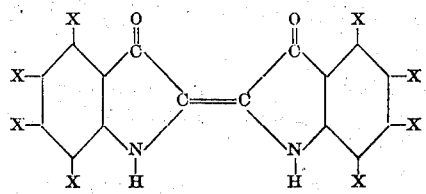

in which two of the X's in each benezene nucleus stand for bromine or chlorine atoms and at least one of the X's in each benzene nucleus for an alkyl group, which are dark blue powders, soluble in concentrated sulfuric acid with a greenish color and forming yellow vats from which cotton is dyed fast blue shades.

6. As a new product the symmetrical indigoid vat dyestuffs having most probably the formula:—

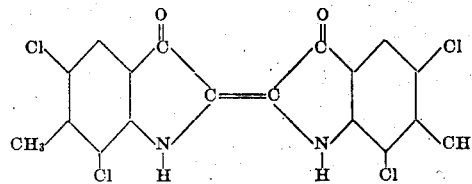

which is a dark blue powder, soluble in concentrated sulfuric acid with a green color and forming a yellow vat from which cotton is dyed fast reddish-blue shades.

In testimony whereof I have hereunto set my hand.

CARL KRAUSS.